United States Patent [19]

Selesky

[11] Patent Number: 6,125,342
[45] Date of Patent: Sep. 26, 2000

[54] PRONOUN SEMANTIC ANALYSIS SYSTEM AND METHOD

[75] Inventor: Donald Bryant Selesky, Westford, Mass.

[73] Assignee: L & H Applications USA, Inc., Waltham, Mass.

[21] Appl. No.: 08/972,861

[22] Filed: Nov. 18, 1997

[51] Int. Cl.[7] .................................................. G06F 17/27
[52] U.S. Cl. ................................................................. 704/9
[58] Field of Search ................................. 704/1, 9, 255, 704/257, 251, 275, 270; 707/530

[56] References Cited

U.S. PATENT DOCUMENTS

5,321,608  6/1994  Namba et al. ............................. 704/9
5,729,659  3/1998  Potter ...................................... 704/270

Primary Examiner—Forester W. Isen
Assistant Examiner—Patrick N. Edouard
Attorney, Agent, or Firm—Bromberg & Sunstein LLP

[57] ABSTRACT

A system and method of interpreting user commands for controlling a computer application. When a user command includes a pronoun such as "it", "this", "that" etc., the pronoun will be interpreted in an intuitive fashion according to the context of the computer application. In a word processing application, users can issue commands such as "copy that" or "bold that", and the system will select the proper object to perform the operation on. The system can be used with a speech recognition application to allow users to control applications easily through voice commands and text.

7 Claims, 5 Drawing Sheets

PRONOUN SEMANTIC ANALYSIS SYSTEM AND METHOD

BACKGROUND

Speech recognition systems are becoming more prevalent, due to improved techniques combined with a great need for such systems. Speech recognition systems (SRS) and Applications (SRAs) are used in a wide range of applications including free speech entry (Continuous Speech Recognition) into word processing systems, speech selected items for limited choice entry categories, such as form completion, and verbal commands for controlling systems.

In the area of verbal commands for controlling systems, a goal is to allow near normal human speech to be comprehendible by a computer system. This field is referred to as Natural Language Processing (NLP), an area where humans excel but is incredibly difficult to define in precise mathematical terms needed for computational processing.

In free speech entry systems, such as word entry into a word processing program, a person speaks, and the SRS system inserts the words into the word processing program. It is not necessary for the SRS to understand the meaning of the words, only to recognize the words. For verbal commands, the system must understand natural language well enough to properly interpret the commands.

One problem with natural language is the use of pronouns such as "this" "that" and "it". In normal English (and most other languages), pronouns serve several purposes. One purpose is as a determiner, as in the sentence "Hand me that piano." Here the pronoun "that" defines which piano to hand over. Another purpose is a pronoun which refers to a topic discussed earlier, For example, in "My dog brought me a dead squirrel. I buried it in my neighbor's yard.", it's understood that the pronoun "it" refers to the squirrel, not the dog.

However, there is often ambiguity which is not easily solved such as in "My neighbor saw my dog digging up the dead squirrel. He was very excited.", it is unclear whether "he" refers to the neighbor or to the dog. If the listener has more information, such as real-world knowledge or context information, the listener may be able to determine that the dog was excited, not the neighbor In computer applications which allow users to manipulate data and objects through voice or typed natural language commands, the use of pronouns becomes very problematic. Determining what object or data the pronoun "it", "that" or "this" refers to is exceptionally difficult. The computer application usually has no real-world knowledge of the domain for objects and data. Context information might be helpful, however, if it is counter-intuitive to what a user expects, then the computer application will not function in an intuitive ways which the user is expecting.

Context information is helpful to bridge the gap between a low-level computer application, and a context the user views information in. For example, in a word processing operation, the word processor is displaying information on a computer screen in terms of binary coded symbols with different font display characteristics and formatting information, while the user is thinking in terms of words, sentences and paragraphs.

For example, if a user is manipulating text on a computer display device (such as a computer screen), the user may wish to cause a word to be underlined. The user can issue the command "Underline this word." If the computer application has an understanding of what words are, and to which word the user means (such as the word at the current insertion point), the computer application can proceed to select the word, and then underline it.

However, if the user then states "Move up one line.", causing the current insertion point to be in or proximate another word, and then states "bold that", the computer application has no comprehension as to whether the user means the previously selected and underlined word, or the new word at the current insertion point.

The problem is even more confusing in that there may be several objects or data which could equally be applicable to the command the user is requesting. For example, if the user states "bold that", the command is equally applicable to an entire document of text, or a paragraph or sentence as well as a single word. If the display is of a set of graphical objects, such as a CAD drawing, the display objects can be one object or the entire set of displayed objects.

If the computer application attempts to comprehend pronoun usage, any ambiguity would either result in misunderstanding (and improperly executed commands), or require requesting clarification from the user (asking the user "Do you mean bold the word, the sentence or the paragraph?). Requesting clarification would result in slow progress, because each subsequent pronoun usage is different, and the user would need to be queried for each usage. The user would soon give up on trying to use pronouns to manipulate objects. Such a result defeats the whole purpose of trying to make speech recognition and natural language processing an easy system for people to use.

SUMMARY OF THE INVENTION

The present invention includes a method of interpreting a sequence of words, whether spoken, written or otherwise, including a verb and a pronoun. If the word sequence includes a noun referred to by the pronoun, then the pronoun is ignored (or removed). If a display object on a computer display device is selected (for example, a word in a word-processing application display), the pronoun is interpreted as referring to the selected display object (or objects). If no display objects are presently selected, then the pronoun is interpreted as referring to the display objects which is proximate a current insertion point on the computer display device.

The steps of selecting the display device proximate the current insertion point includes causing the proximate display object to become selected, causing the now selected object to be manipulated according to the verb in the word sequence, and then causing the selected object to be unselected.

The steps of selecting the display object proximate the current insertion point also includes the steps of if the proximate display object is not an applicable object for the action as defined by the verb in the word sequence, a display object proximate the current insertion point which is an applicable object for the action is selected.

The present invention is applicable to applications including word processing applications running on computers. The present invention also works with speech recognition applications to assist users in controlling other applications through speech commands. Some objects which can be manipulated in this way include characters, words, sentences, paragraphs, pages, sections, documents, windows, applications etc.

DETAILED DESCRIPTION

Figure 1:
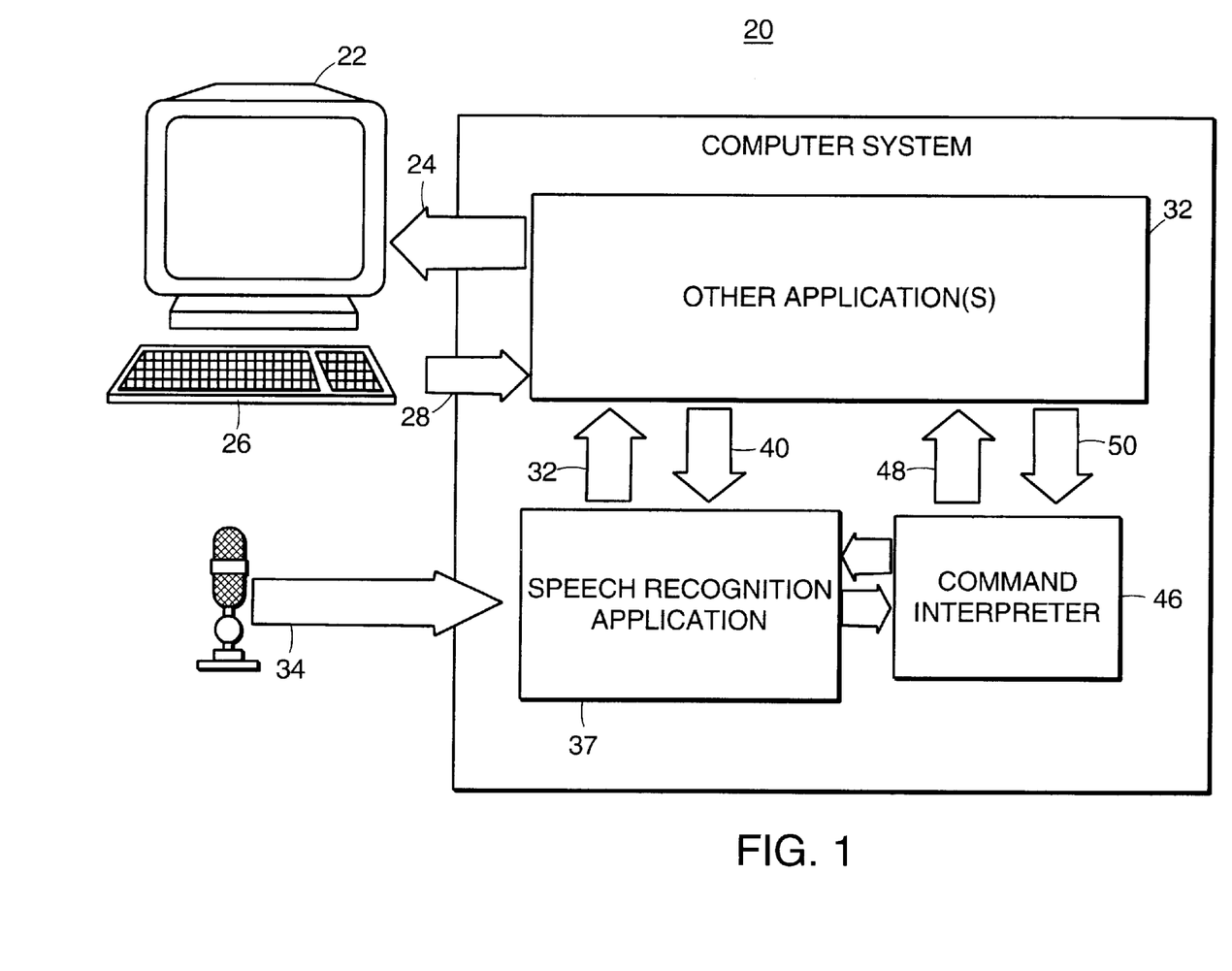
FIG. 1 is an overview of a computer system including a speech recognition application and command interpreting system to control another application according the present invention.

A general purpose computing system 20 which includes speech recognition and speech control of applications in shown in FIG. 1. The computer system 20 is any general purpose computer, including workstations, personal computers, laptops, and personal information managers. In a typical arrangement, the computing system 20 displays output 24 on a computer monitor 22, for a user to see. The user can type input on keyboard 26, which is input into computer system 20 as shown by arrow 28. Other user display and input devices are also available, including display pointers such as a mouse etc. (not shown).

At least one application 32 is running on computer system 20, which the user normally can monitor and control using monitor 22 and keyboard 26. Application 32 is any computer application which can run on a computer system, including operating systems, application specific software, etc. Besides displaying output, applications can also control databases, perform real-time control of robotics, and perform communications etc. For this description, a word processing application will be used for exemplary purposes, however, there is no limit on the type of applications and systems controllable by the present invention.

For entering words and commands to an application 32, a user speaks into a microphone 34. Microphone 34 includes headset microphones and any other apparatus for converting sound into corresponding electrical signals. The electric signals are input into SRA (Speech Recognition Application) 37, as shown by arrow 36. The electric signals are typically converted into a format as necessary for analysis by SRA 37. This includes conversion by a real-time A/D converter (not shown), which converts the analog electrical signals into discrete sampled data points represented as digital quantities. The digital data can also be preprocessed using various signal processing and filtering techniques, as is well known in the art.

SRA 37 is a speech recognition system which converts the input data into candidate words and word phrases. SRA 37 includes any type of speech recognition system, including a Continuous Speech Recognizer (CSR), or a discrete word recognizer. An example SRA 37 is Voicepad, as produced by Kurzweil Applied Intelligence of Waltham, Mass. Voicepad runs on a variety of platforms including Microsoft Windows Systems including Windows 3.1, NT and Windows 95.

Although SRA 37 is shown as running on the same computer system 20 as other applications 32, SRA 37 can run on a separate computer system, including a computer system with hardware specifically designed for speech recognition.

SRA 37 is capable of controlling application 32 using standard interface methods 33 including IPC (inter-process communication) such as OLE (Object Linking and Embedding), sockets, DDE, and many other techniques as well known in the art. SRA 37 is also able to monitor and obtain information 40 about application 32 using the same techniques. For the example of word processing, SRA 37 inserts the words spoken by the user into the word processing buffer of application 32. The user can use the keyboard 26 or microphone 34 interchangeably to enter text into application 32.

Either separate or combined with SRA 37 is command interpreter 46. SRA 37 can communicate fully with command interpreter 46 as shown by arrows 42, 44. Command interpreter 46 receives candidate words or word phrases from SPA 37, which command interpreter 46 then processes into instructions 48 for application 32. These instructions can be any form as needed for controlling application 32, including macros, interpreted code, object code and other methods as will be discussed below. Command interpreter 46 can also monitor application 32 as shown by arrow 50. Similar to SRA 37, command interpreter 46 need not be in the same computer system 20 as other applications 32.

In the example of word processing applications, a user speaks text to be entered into the word processor, which is processed by SRA 37 and sent to application 32. The user can also speak editing and formatting commands, which are processed by SRA 37 and command interpreter 46, and then sent to application 32. Some example editing commands includes "delete word", "move up one page", "bold this word", etc. The user never has to use the keyboard 26, although they are always free to do so.

In another example, of a spreadsheet or CAD drawing program, the user can specify display objects to create, and position on the screen or table. Example commands include "insert a formula in Cell A6", or "create a U-joint symbol" etc.

The functioning and control of Command Interpreter 46 is described in co-pending U.S. patent application Ser. No. 08/885,631, filed Jun. 30, 1997, and entitled "System of Command Parsing and Rewrite",which is fully incorporated here by reference.

The present invention is directed towards a system and method for interpreting the meaning of pronouns in commands entered by the user, whether the commands originate from spoken words processed by an SRA 37, or input by some other means such as text entry on a keyboard 26. Specific meanings are assigned to pronouns, based on context. These meanings are consistent with English, allowing a user to comfortably use the system with minimal variations from everyday language usage.

Figure 2:
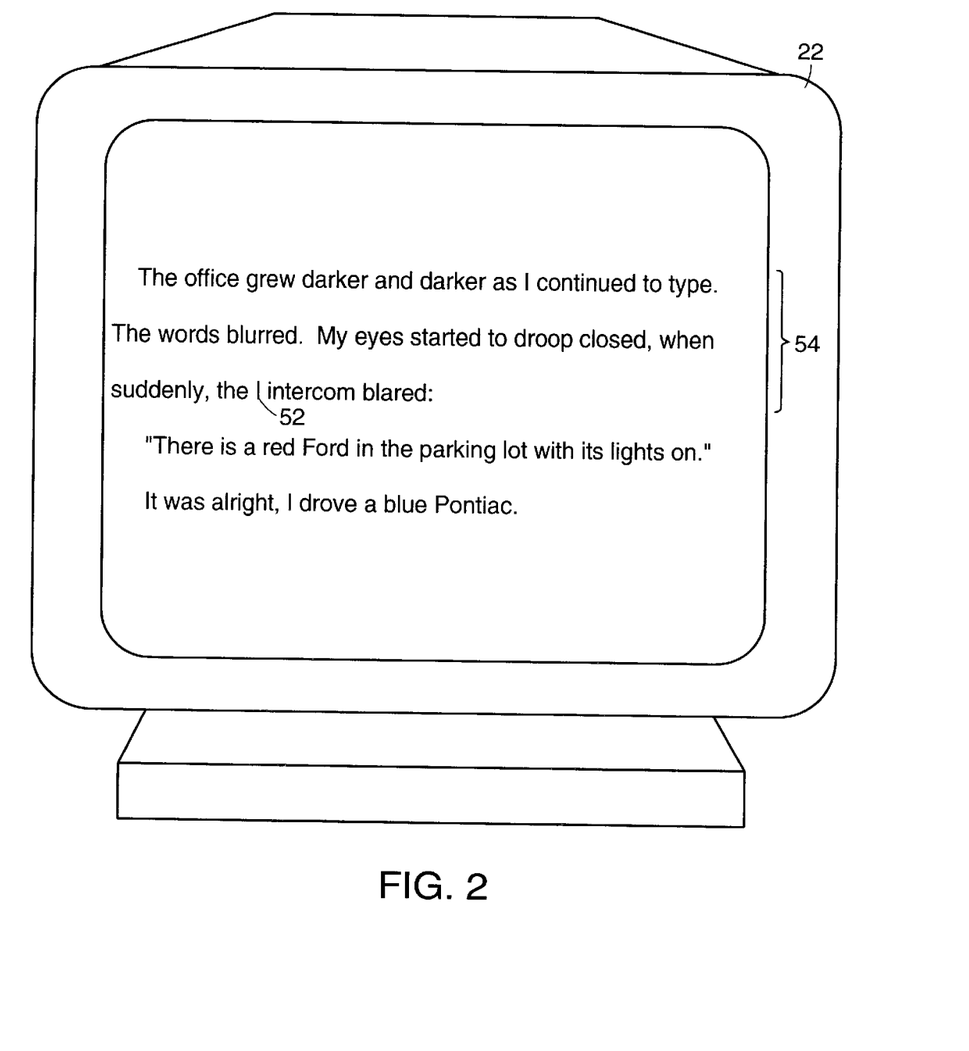
FIG. 2 is a display of a monitor screen showing text being edited in accordance with the present invention.

As shown in FIG. 2 a user is manipulating text as displayed on display device 22 (for example, a computer monitor) by a word processing application. The current insertion point 52, where text would be inserted (or overwritten), is between the words "blaring" and "intercom". Most word processing applications provide a visual indication of the current insertion point 52. The current insertion point 52 can be moved using arrow keys on the keyboard, by using a cursor in connection with a pointing device such as a mouse or trackball, or preferably by voice commands by the user.

If the user wishes to italicize (convert the font to italics) the paragraph 54, a typical word processor requires the user to first identify what text the user wishes to modify. This is usually done by "selecting" the text. The user uses arrow keys, or the cursor to "sweep" over the screen, indicating the amount of text the user wishes to modify. The word processor typically indicates selected text or objects by displaying them in reverse video, or another color, to visually distinguish the selected text from the remaining text (not shown). Once the user has selected the text, the user can then modify it, such as by converting the font to italics.

In using natural language commands to italicize the paragraph 54, the user would state "italicize this paragraph". With the current insertion point 52 as reference to the paragraph to italicize, command interpreter 46 FIG. 1 first causes the paragraph 54 FIG. 2 to be selected, and then causes the font to be italicized. Command interpreter 46 then causes the paragraph to be unselected, thereby leaving the word processing application in a state similar to before the operation. The most important similarity is that the current insertion point 52 is restored to its location before the operation was performed.

How command interpreter 46 recognizes paragraph boundaries is dependent on the word processing application. For example, in Microsoft Word, paragraphs are implicitly delimited, so there are macro commands available for moving over and selecting paragraphs. For other word processors, other techniques can be used to identify paragraph boundaries, such as scanning for two or more linefeed characters as delimiters.

Turning to the interpretation of pronouns, a command interpreter according to the present invention will interpret the pronoun such as "it" "that" or "this" as referring to the presently selected objects or text. Therefore, another way for a user to italicize paragraph 54 is to state the word sequence "Select paragraph. Italicize it." Command interpreter 46 will interpret "it" as referring to the selected text. It does not matter how the text was selected, whether by user action with the cursor or command input. The current selection is "it".

If the word sequence has a noun referred to by the pronoun, then the pronoun is ignored. Therefore, the user could state "Select this paragraph.", which is equivalent to "Select paragraph." In the preferred embodiment, the pronoun is dropped during a rewrite stage of the word sequence by command interpreter 46. However the system of the present invention could also easily be written to simply ignore the pronoun.

The pronouns "it" "this" and "that" are interchangeable, and it does not matter which pronoun the user uses in the word sequence.

If there is no current selection, command interpreter 46 selects the smallest appropriate displayed object proximate the current insertion point. Whether a displayed object is appropriate depends on the verb in the word sequence. For example, with reference to FIG. 2, if the user states "bold that", and there is no current selection, there are several displayed objects which might be appropriate to be bolded, namely the word "intercom", or the paragraph 52, or the entire screen of text. In this example, the smallest appropriate object is the word "intercom", therefore the command interpreter causes the word to be selected, converted to bold font, and then unselects it.

As another example, if the user states the word sequence "Left align that", a word is not an appropriate object for alignment, but a paragraph is. Therefore, the paragraph 52 would be selected, and then aligned left. Therefore this command is equivalent to "left align this paragraph".

Figure 3:
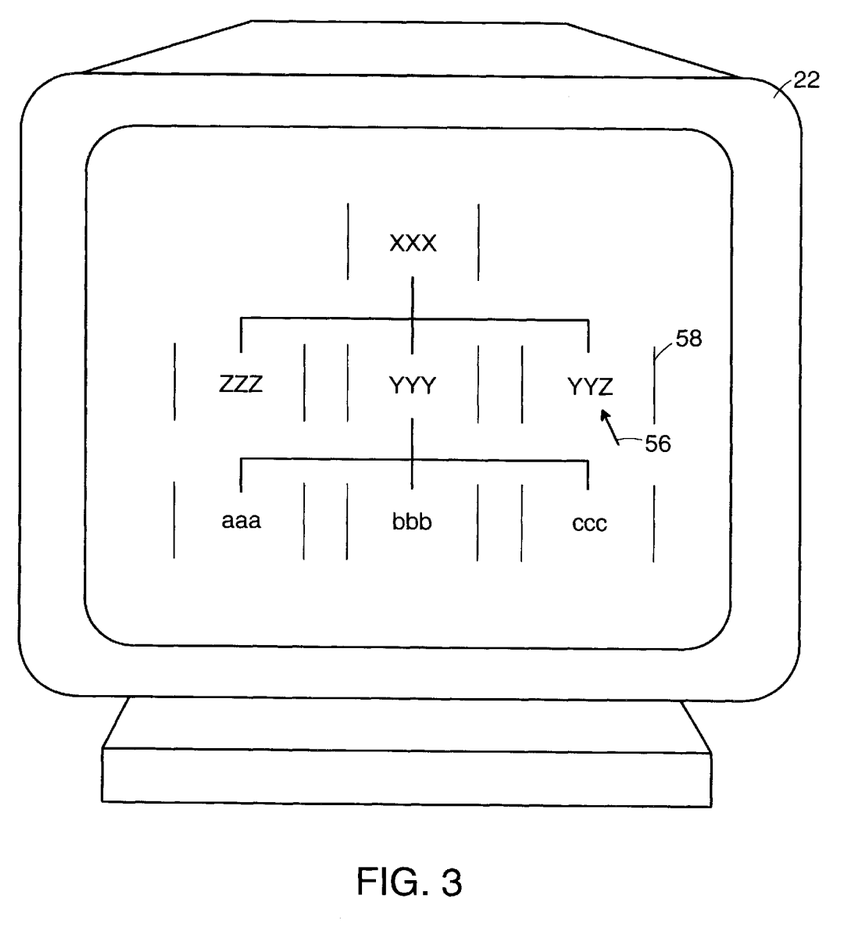
FIG. 3 is a display of a monitor screen showing graphics display objects being edited in accordance with the present invention.

The present invention performs equally well for other applications, including graphical object displays such as CAD systems. As shown in FIG. 3, most graphical display systems allow displayed objects, such as the text objects XXX, YYY, etc., to be selected and manipulated by a cursor 56. If the user states "Select that", command interpreter 46 will select the proximate appropriate object, in this case block 58. The user can then issue commands such as "move it up" or "Delete it", and command interpreter 46 will cause block 58 to be appropriately repositioned in the chart, or deleted.

Continuing with the present example, if there is no current selection, and the user issues the command "italicize that", Command Interpreter 46 will locate the closest proximate appropriate displayed object. Cursor 56 is closest to block 58, however, a block is not an appropriate displayed object for italicizing. However the text "YYZ" within block 58 is an appropriate displayed object for italicizing, therefore Command Interpreter 46 will select the text "YYZ", convert it to italicized font, and then unselect the text.

Figure 4:
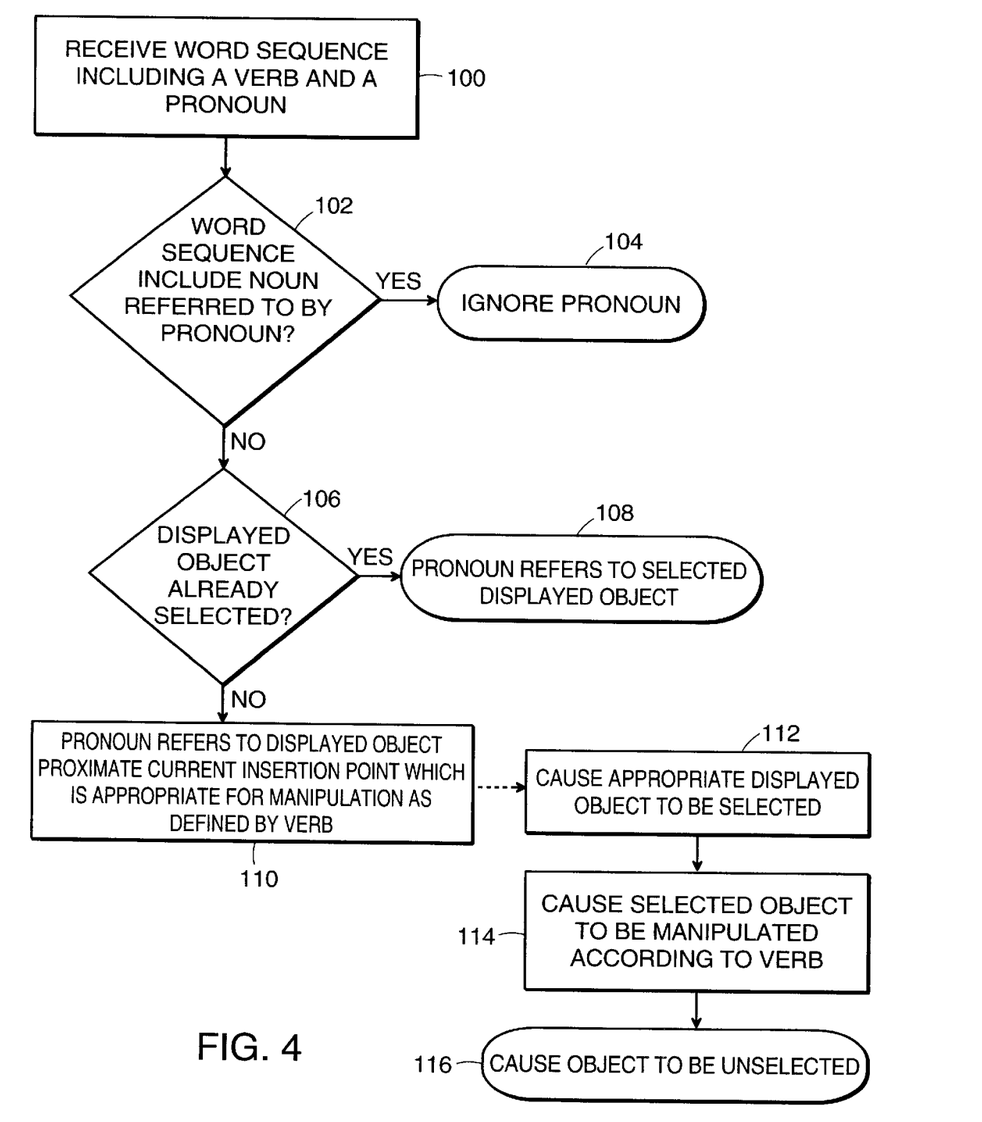
FIG. 4 is flow chart of the steps performed according to the present invention.

The steps as carried out by the present invention begins with receiving a word sequence including a verb and a pronoun, step 100 FIG. 4. The word sequence is checked to determine if it includes a noun referred to by the pronoun, step 102, such as "Move this Sentence to the end of the paragraph". If the noun is present, the pronoun is treated as a determiner, and is ignored, step 104. The previous word sequence is interpreted as "Move Sentence to end of paragraph." As another example, compare "Bold that word" and "Bold that". Here, "that" is treated as a determiner in the first command, and as a pronoun in the second.

If there is no noun referred to by the pronoun, the application is checked to determine if there is a current selection, step 106. If so, then the pronoun is interpreted as referring to the currently selected object, step 104. It is still possible that the currently selected object is not appropriate for manipulation according to the verb in the word sequence, which would be detected as described below.

Should there be no currently selected object or text, then the pronoun is interpreted as referring to the displayed object proximate the current insertion point which is appropriate for manipulation as defined by the verb in the word sequence. As previously described, the current insertion point can vary in context depending on application 32. The current insertion point can be defined by the cursor 56 in a graphical system such as a CAD application.

Once the appropriate object is caused to be selected, step 112, the selected object manipulated according to the verb, step 114, and then caused to be unselected, step 116. Therefore, unless a command explicitly states that a displayed object is to be selected, then executing the command as defined by the word sequence does not leave a current selection. In other words, unless the command is "select that", there will be no selected object when the command is completed.

Figure 5:
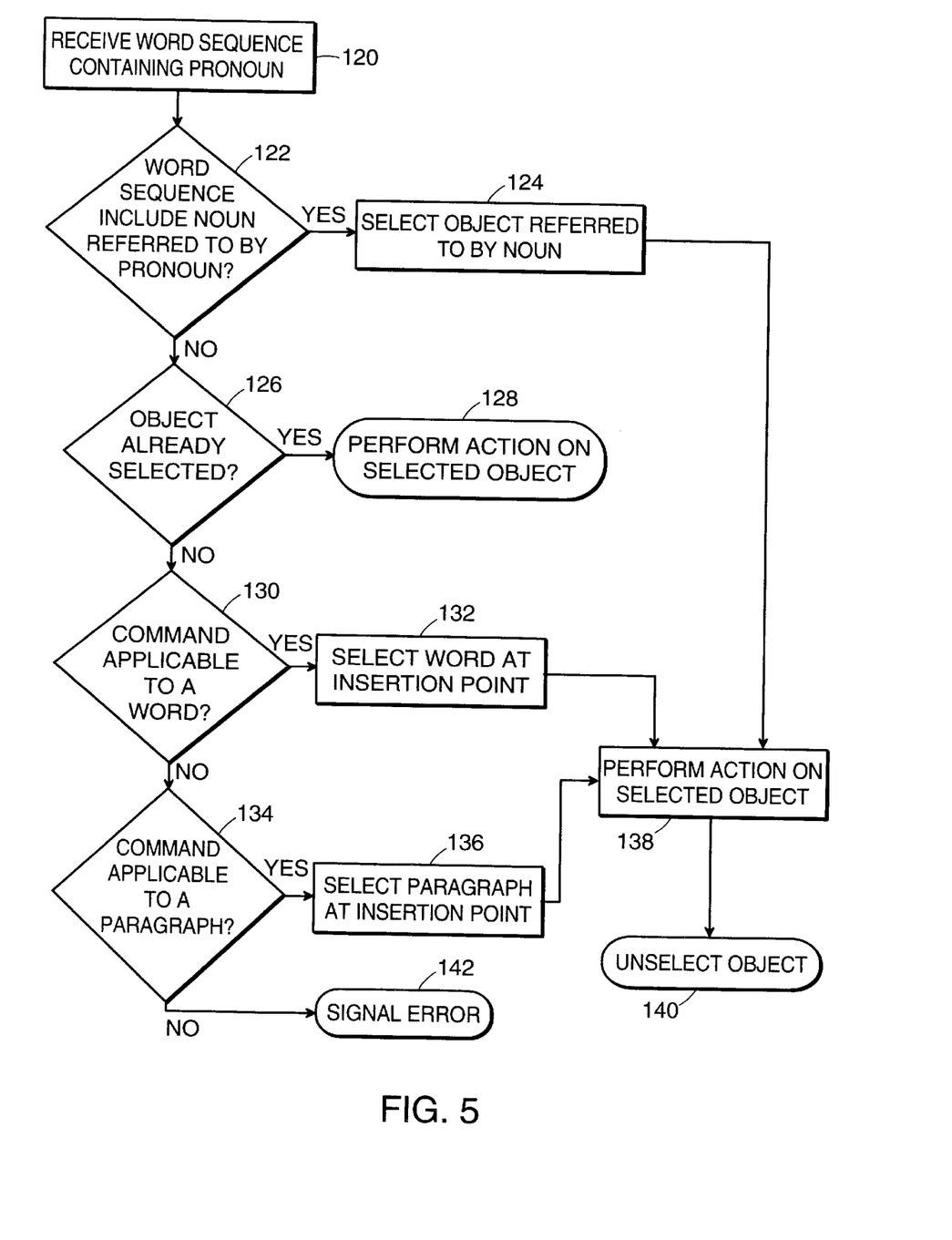
FIG. 5 is flow chart of the steps performed according to one embodiment of the present invention.

In a preferred embodiment of the present invention for use with a word processing application 32, the command interpreter 46 receives a word sequence containing a pronoun, step 120 FIG. 5.

The command interpreter processes the word sequence using CFG (Context Free Parsing), and parse tree rewriting, as fully described in co-pending U.S. Patent Application Attorney Docket No. 47201, which is incorporated by reference.

The CFG rules include the following rules for dealing with pronouns and determiners:

$$\text{Pronoun} \to \text{"it"}|\text{"that"}|\text{"this"}|\text{"them"} \quad (1)$$

$$\text{Dets} \to \text{"the"}|\text{"this"}|\text{"that"} \quad (2)$$

$$\text{Detp1} \to \text{"the"}|\text{"these"}|\text{"those"} \quad (3)$$

Rule (1) defines that "it", "this", and "that" are completely equivalent, so that "bold this", "bold that", and "bold it" all have the same semantics. The "|" between the matching components indicates "or", in that any of the alternatives is a pronoun.

In step 122, the word sequence is examined to determine if is a noun in the word sequence for which the pronoun serves as a determiner or modifier. This is performed by the CFG rules, including the following rules:

$$\text{ObjectNP} \to \text{SelectionNP}|\text{TextTableSelectNP}|\text{Pronoun} \quad (4)$$

$$\text{TextObjectNP} \to \text{SelectionNP}|\text{Pronoun}|\text{TextSelectNP} \quad (5)$$

$$\text{SelObjectNP} \to \text{SelectionNP}|\text{Pronoun} \quad (6)$$

$$\text{NoSelectionNP} \to \text{TextTableSelectNP}|\text{Pronoun} \quad (7)$$

$$\text{SelectionNP} \to \{\text{The}\}\text{"selection"} \quad (8)$$

NP is an acronym for "Noun Phrase". As an example, take the word sequence "bold that". The CFG rules for bold include:

$$\text{BoldN} \to \text{"bold"}|\text{"boldface"}|\text{"bolded"} \quad (9)$$

$$\text{Bold} \to \text{BoldV ObjectNP}|\text{SetV ObjectNP "to" BoldN}|\text{MakeV ObjectNP BoldN} \quad (10)$$

$$\text{BoldV} \to \text{"bold"}|\text{"boldface"} \quad (11)$$

Rule (11) defines that "bold", and "boldface" are recognized as a BoldV (Bold Verb) form. In processing the example "bold that", rule (11) identifies "bold" as a BoldV, rule (1) identifies "that" as a Pronoun, rule (4) identifies Pronoun (by itself) as a valid ObjectNP (Object Noun Phrase), and rule (10) identifies Bold as a valid combination of BoldV followed by an ObjectNP.

If the pronoun is simply determined to be a determiner, as in the word sequence "bold that line", the determiner "that" is removed in the first phase of rewriting, where determiner nodes are not rewritten. As previously described the system could just as easily be written to ignore determiners during processing, for example with a rewrite rule such as Bold ("bold", Object (#. "word"))==>Dobold.

$$\text{Dets} ==> * \quad (12)$$

$$\text{Detp1} ==> * \quad (13)$$

Rule (12) and (13) state that determiner pronouns are not rewritten.

Continuing with FIG. 5, the object referred to by the noun is selected, step 124. In the preferred embodiment, the selection process is performed by Visual Basic code, including a sample shown in Appendix B.

In the case where the word phrase includes a verb such as "bold", the action is performed on the selected object, step 138, and then the object is unselected, step 140. Preferably, only in the case when the verb is "select" as in "select this page", is the object left selected when the process finishes.

If there is no pronoun, but an object is already selected, step 126, the action is performed on the previously selected object, step 128. In the preferred embodiment, this is performed by visual basic code, which is presented in Appendix B, which queries the application 32 as to whether there is a current selection. In this case, the object is left selected when the process completes.

If an object is not presently selected, the verb is examined to determine if the operation is applicable to the object proximate the insertion point, in this case a word, step 130. In the preferred embodiment, this is performed by the function 'select that', which is presented in Appendix B. This function locates the beginning and end of a word proximate the insertion point, and causes it to be selected. Once the word is selected, the action is performed on it, step 138, and the word is unselected, step 140.

If the verb in the word sequence is not applicable to a word, such as in the phrase "bullet this" (which adds a bullet to the beginning of a paragraph), or "increase border for that", the next largest object is tried. In this case, the operations are valid for paragraphs, step 136. In the preferred embodiment, the rewriting rules which control operations peculiar to paragraphs include code for selecting the paragraphs, as shown in Appendix B. Once the operation is performed, the object is unselected, steps 138 and 140.

If the action does not apply to a paragraph, other applicable objects, such as tables are tried (not shown). If no object exists which could be selected and acted upon, an error is signaled to the user to inform them the command is not proper in this context, step 142.

A complete example of rewriting a command string including a pronoun is shown in Appendix A for the word sequence "bold that". The input to phase 1 is the result of the CFG parser, including the rules listed above. The final output is a program string which will cause a visual basic interpreter or compiler perform the operations as described above.

Accordingly, the present invention allows command interpreters to perform actions based on simple, intuitive commands from users. The CFG, rewrite rules and code allow easy modification and expansion of acceptable commands. The system and method is easily modified for a different application, such as a spreadsheet or drawing program, with different elements for selecting and manipulating. Further, the present invention can work for other languages besides English, such as Spanish, French, German, Japanese, or any other commonly used or special-purpose language.

As various changes could be made in the above constructions without departing from the scope of the invention, it should be understood that all matter contained in the above description or shown in the accompanying drawings shall be interpreted as illustrative and not in a limiting sense.

Appendix A

The following describes the conversion of the command "bold that" to Visual Basic commands that effect the desired action. The
conversion is controlled by WINWORD.KVG (described separately).

In the listing:

"nonterm" is a nonterminal node that has zero to N children "term" is a terminal string The tree is described with the root node (the top of the tree) on the first line beginning, on the left margin. Each child of a given node is on a separate line, indented two spaces, so that:

nonterm (X)
  nonterm (Y)
    term ("y")
  term ("z")

is a tree:

the root node is labeled X, with two children
the first child of X, named Y, has one child, the string "y" the second child of X is the string "z"

The input to each rewrite pass is a tree. That tree is processed by the rewrite system and the specification from the KVG that
constitutes that pass. The output of each pass becomes the input to the next pass. The output of the last pass is "stringized";
that is, the terminal strings are taken in left-right,
depth-first order and concatenated together to form the VB program code.

command: bold that

--- input to pass: 1
nonterm (Command)
nonterm (TextFormattingCmds) nonterm (Bold)
nonterm (BoldV) term ("bold")
nonterm (ObjectNP)
nonterm (Pronoun) term ("that")

--- input to pass: 2
nonterm (Command)
nonterm (Bold)
nonterm (BoldV)

- 13 - term ("bold")
nonterm (ObjectNP)
nonterm (Pronoun)
term ("that")

--- input to pass: 3
nonterm (Command)
nonterm (Bold)
nonterm (BoldV)
term ("bold")
nonterm (ObjectNP)
nonterm (Pronoun)
term ("that")

--- input to pass: 4
nonterm (Command)
nonterm (Bold)
nonterm (BoldV)
term ("bold")
nonterm (ObjectNP)
nonterm (Pronoun)
term ("that")

--- input to pass: 5
nonterm (Command)
nonterm (Bold)
nonterm (BoldV) term ("bold")
nonterm (ObjectNP)
nonterm (Pronoun)
term ("that")

--- input to pass: 6
nonterm (Command)
nonterm (Bold)
nonterm (BoldV) term ("bold")
nonterm (ObjectNP)
nonterm (Pronoun) term ("that")

--- input to pass: 7
nonterm (Command)
nonterm (Bold)
nonterm (BoldV) term ("bold")

- 14 - nonterm (ObjectNP)
nonterm (Pronoun) term ("that")

--- input to pass: 8
nonterm (Command)
nonterm (Bold)
nonterm (BoldV)
term ("bold")
nonterm (ObjectNP)
nonterm (Pronoun)
term ("that")

--- input to pass: 9
nonterm (Do)
nonterm (DoCmdStart)
nonterm (DoMarkundoStart)
nonterm (DoMarkCursor)
nonterm (Do)
nonterm (SaveAttrs)
nonterm (ObjectNP)
nonterm (Pronoun)
    term ("that")
nonterm (Select)
nonterm (ObjectNP)
nonterm (Pronoun)
    term ("that")
nonterm (DoBold)
nonterm (Unselect)
nonterm (ObjectNP)
nonterm (Pronoun)
    term ("that")
nonterm (ResetAttrs)
nonterm (Obj ectNP)
nonterm (Pronoun)
    term ("that")
nonterm (DoMarkUndoEnd)
nonterm (DoCmdEnd)

--- input to pass: 10
nonterm (Do)
nonterm (DoCmdStart)
nonterm (DoMarkundoStart)
nonterm (DoMarkCursor)
nonterm (Do) nonterm (DoSaveAttrsThat) nonterm (Select)
nonterm (Pronoun) term ("that")

nonterm (DoBold) nonterm (Unselect)
nonterm (Pronoun) term ("that")
nonterm (DoResetAttrsThat)
nonterm (DoMarkUndoEnd) nonterm (DoCmdEnd)

--- input to pass: 11
nonterm (Do)
nonterm (DoCmdst art) nonterm (DoMarkundoStart)
nonterm (DoMarkCursor)
nonterm (Do)
    nonterm (DosaveAttrsThat)
    nonterm (DoSelectThat)
    nonterm (DoBold)
    nonterm (DoUnselectThat)
    nonterm (DoResetAttrsThat)
nonterm (DoMarkUndoEnd)
nonterm (DoCmdEnd)

--- input to pass: 12
nonterm (Do)
nonterm (DoCmdStart)
nonterm (DoMarkundoSt art)
nonterm (DoMarkCursor)
nonterm (Do)
    nonterm (DoSaveAttrsThat)
    nonterm (DoSe lectThat)
    nonterm (DoBold)
    nonterm (DoUnselectThat)
    nonterm (DoResetAttrsThat)
nonterm (DoMarkUndoEnd)
nonterm (DoCmdEnd)

--- input to pass: 13
nonterm (Do)
nonterm (DoCmdStart)
nonterm (DoMarkUndoSt art)
nonterm (DoMarkCursor)
nonterm (Do)
    nonterm (DoSaveAttrsThat)
    nonterm (DoSelectThat)
    nonterm (DoBold)
    nonterm (DoUnselectThat)
    nonterm (DoResetAttrsThat)
nonterm (DoMarkUndoEnd)
nonterm (DoCmdEnd)

input to pass: 14
nonterm (Do)
nonterm (DoCmdStart)
nonterm (DoMarkUndoStart)
nonterm (DoMarkCursor)
nonterm (Do)
    nonterm (DoSaveAttrsThat)
    nonterm (DoSelectThat)
    nonterm (DoBold)
    nonterm (DoUnselectThat)
    nonterm (DoResetAttrsThat)
nonterm (DoMarkUndoEnd)
nonterm (DoCmdEnd)

--- input to pass: 15
nonterm (Do)
nonterm (Concat)
    term ("On Error Resume Next\n")
    term ("Cmdstart\n")
term ("Markundostart\n")
term (I' Markcursor\n")
nonterm (Do)
    term ("if not issel () then SaveAttrs\n")
    nonterm (Concat)
term ("if issel () then\n")
term ("  selectedthat = O\n")
term ("else\n")
term ("  wb.editqoto "\startofsel"\n")
term ("  SelectThat\n")
term ("end if\n")
    term ("WB.Bold 1\n")
    term ("if selectedthat then unselect\n")
    term ("if selectedthat then ResetAttrs\n") term ("X: MarkundoEnd\n")
nonterm (Concat)
    term ("CmdEnd\n")
    term ("On Error GoTo O\n")
    term ("if myerror <> 0 then error myerror\n")

---

VB:
On Error Resume Next
CmdStart
MarkundoStart
MarkCursor
if not issel () then SaveAttrs
if issel () then

```
            selectedthat = 0
    else
            wb.editgoto "\startofsel"
            SelectThat
    end if
    WB.Bold 1
    if selectedthat then unselect
    if selectedthat then ResetAttrs
    X: MarkUndoEnd
    CmdEnd
    On Error GoTo 0
    if myerror <> 0 then error myerror
```

Appendix B

Rewrite rules and Visual Basic code for allowing selections to determine the proper action to take, as desribed in the specification.

```
// bold

Bold (BoldV, ObjectNP (Pronoun)) ==>
    Do ("if issel () then\n",
       DoBold,
       "else\n",
       DoMarkCursor,
       DoSaveAttrs,
       DoSelectThat,
       DoBold,
       DoUnselect,
       DoResetAttrs ("bold"),
       "end if\n")

Bold (BoldV, ObjectNP) ==>
    Do (SaveAttrs (ObjectNP),
        Select (ObjectNP),
        DoBold,
        Unselect (ObjectNP),
        ResetAttrs (ObjectNP, "bold"))

DoSelectThat ==> "SelectThat\n"

BorderSize (MakeV,
        BorderSizeNP ("border"),
        Bigger (?/incr),
        "in", ObjectNP (Pronoun)) ==>
    Do ("if issel () then\n",
        DoBorderSize (?/incr),
        "else\n",
        Select (ObjectNP (SelectNP (This, DocN ("paragraph")))),
        DoBorderSize (?/incr),
        DoUnselect,
        "end if\n")

// bullet

Bullet (BulletV, ObjectNP (Pronoun)) ==>

Do ("if issel () then\n",
        DoBullet,
```

```
        "else\n",
        Select (ObjectNP (SelectNP (This, DocN ("paragraph")))),
        DoBullet,
        DoUnselect,
        "end if\n")
```

// demote heading one level

```
Demote (DemoteV, ObjectNP (Pronoun), ...) ==>
   Do ("if issel () then\n",
       DoDemote,
       "else\n",
       Select (ObjectNP (SelectNP (This, DocN ("paragraph")))),
       DoDemote,
       DoUnselect,
       "end if\n")

Demote (DemoteV, ObjectNP, ...) ==>
   Do (Select (ObjectNP),
       DoDemote,
       Unselect (ObjectNP))
```

---

VBasic Code

```
rem ********************************************
rem is there a selection
rem ******************************************** function issel
  if app.seltype () = 2 then
    issel = -1
  else
    issel = 0
  end if
end function rem ********************************************
rem select "that"
rem ******************************************** sub selectthat
  if isstartofword () and isendofword () then
    lchar = charonleft ()
    rchar = charonright ()
    if isbreak (lchar) or ispara (lchar) then
```

- 20 -

```
    lpara = -1
   else
    lpara = 0
   end if
   if isbreak (rchar) or ispara (rchar) then
    rpara = -1
   else
    rpara = 0
   end if
   if lpara then
    app.wordright 1,1
   else
    app.wordleft 1,1
   end if
  else
   app.selectcurword
  end if
end sub rem **********************************************
rem select this word
rem ********************************************** sub selectthisword
  if isstartofword () and isendofword () then
   lchar = charonleft ()
   rchar = charonright ()
   if isbreak (lchar) or ispara (lchar) then
    lpara = -1
   else
    lpara = 0
   end if
   if isbreak (rchar) or ispara (rchar) then
    rpara = -1
   else
    rpara = 0
   end if
   if lpara then
    app.wordright 1,1
   else
    app.wordleft 1,1
   end if
  else
   app.selectcurword
  end if
end sub
```

What is claimed is:

1. In a natural language application running on a computer system, said natural language application for allowing a user to manipulate a plurality of displayed objects on a display device through natural language commands, said plurality of displayed objects being generated by a computer system, a method of interpreting a word sequence including a verb and a pronoun comprising:

if said word sequence includes a noun referred to by said pronoun, then ignoring said pronoun;

if one of said plurality of displayed objects is presently selected, then interpreting said pronoun as referring to said presently selected displayed object; and if none of said plurality of displayed objects are presently selected, then interpreting said pronoun as referring to one of said plurality of displayed objects which is proximate to a current insertion point on said display device.

2. The method of claim 1 wherein the step of interpreting said pronoun as referring to one of said plurality of displayed objects which is proximate to a current insertion point on said display device further includes the steps of:

causing said one displayed object which is proximate to a current insertion point on said display device to be selected;

causing said selected display object to be manipulated according to said verb in said word sequence; and causing said selected display object to be unselected.

3. The method of claim 2 wherein the step of causing said one displayed object which is proximate to a current insertion point on said display device to be selected further includes the step of:

if said verb indicates an action which is not applicable to said displayed object which is proximate to a current insertion point on said display device, then selecting a different one of said displayed object which is proximate to a current insertion point on said display devices.

4. The method of claim 1 wherein said user provides said commands through spoken words which are processed by a speech processing application.

5. The method of claim 1 wherein said pronoun includes "it", "this", "that", and "them".

6. The method of claim 1 wherein said displayed objects include selectable display objects.

7. The method of claim 1 wherein said displayed objects include characters, words, sentences, paragraphs, sections, pages, and documents.

* * * * *